Oct. 18, 1938.  M. WAGNER  2,133,367
METHOD OF CHARGING CONTAINERS WITH INERT GAS AND MATERIALS
Filed Dec. 28, 1936  5 Sheets-Sheet 1
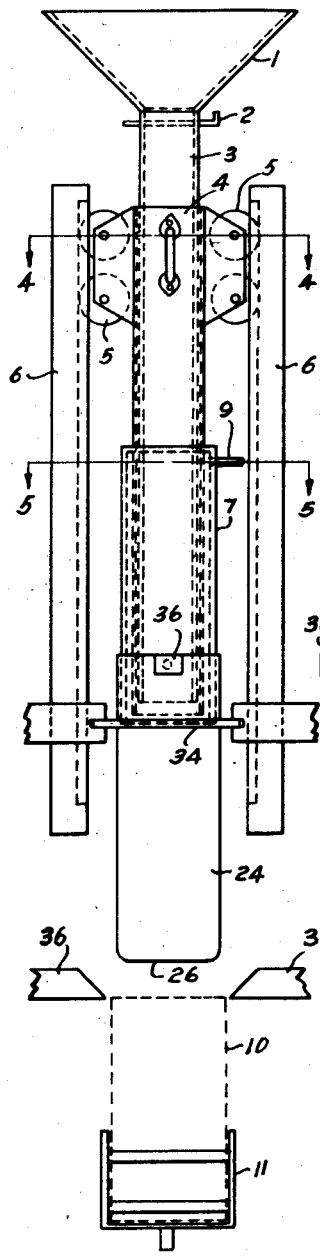
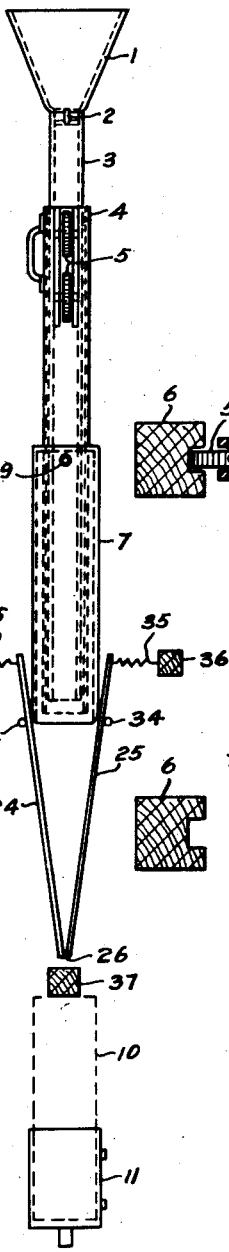
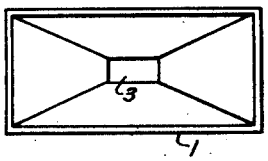
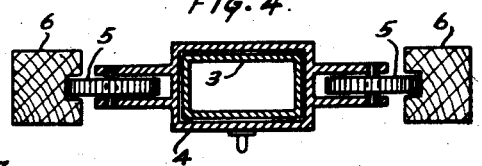
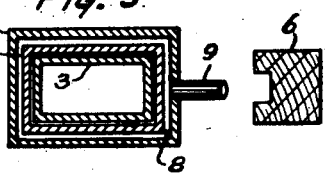
INVENTOR.
MELVIN WAGNER,
BY *Fouhuin & Fouhuin*
ATTORNEYS.

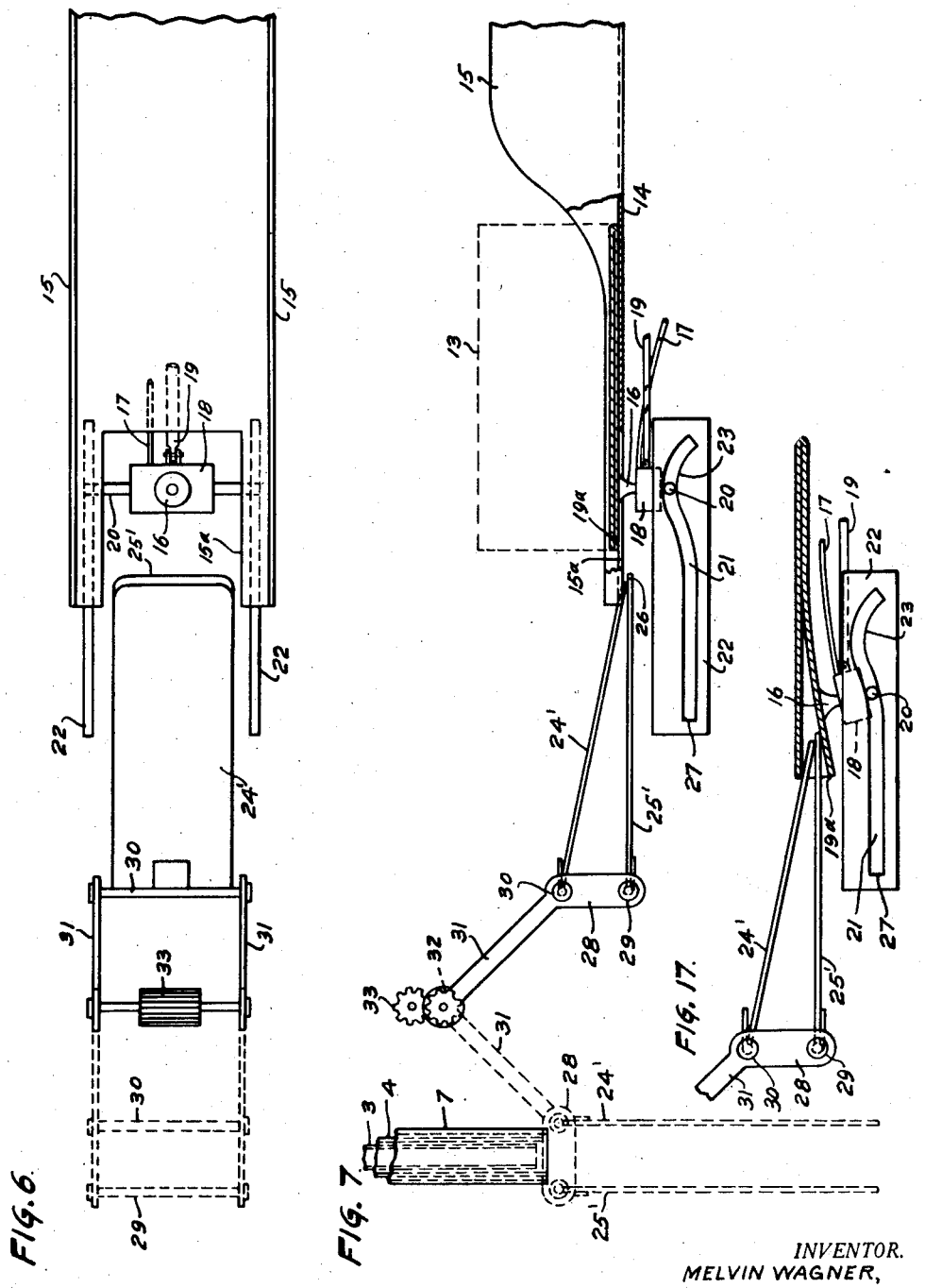

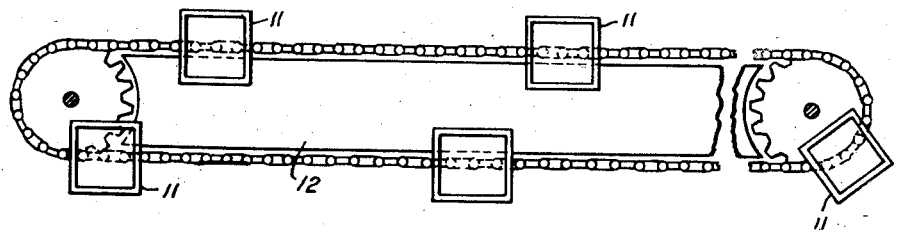
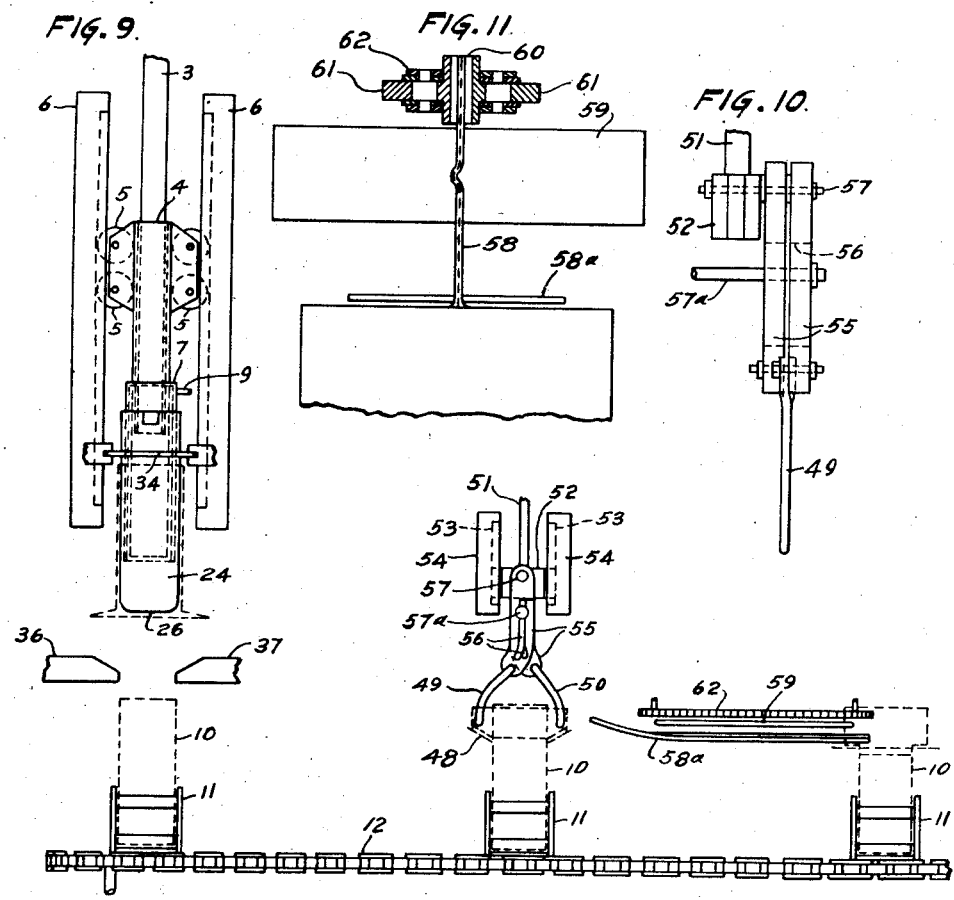

Oct. 18, 1938.    M. WAGNER    2,133,367
METHOD OF CHARGING CONTAINERS WITH INERT GAS AND MATERIALS
Filed Dec. 28, 1936    5 Sheets-Sheet 4

INVENTOR.
MELVIN WAGNER,
BY
ATTORNEYS.

Oct. 18, 1938.  M. WAGNER  2,133,367
METHOD OF CHARGING CONTAINERS WITH INERT GAS AND MATERIALS
Filed Dec. 28, 1936   5 Sheets-Sheet 5
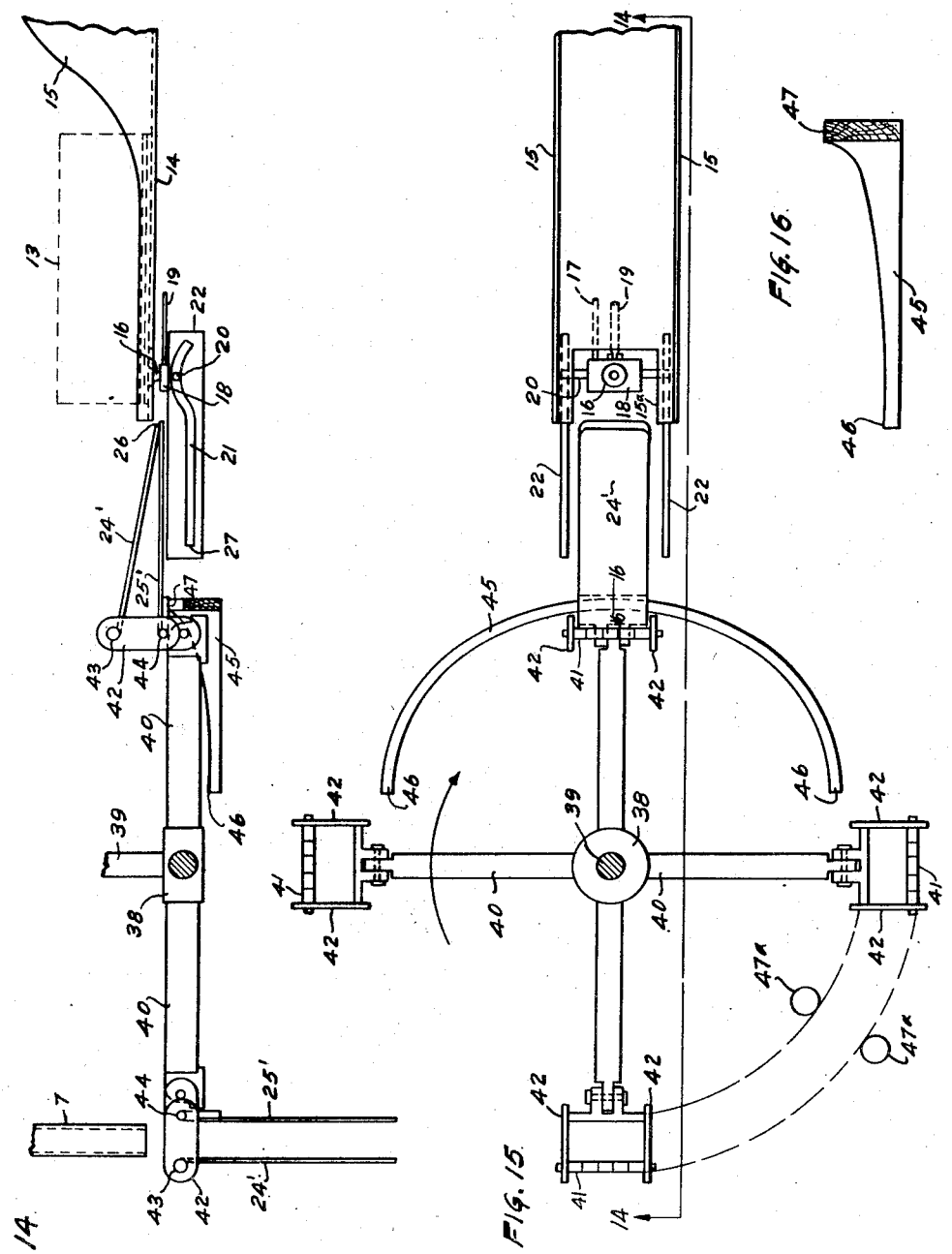
INVENTOR.
MELVIN WAGNER,
BY
ATTORNEYS.

UNITED STATES PATENT OFFICE 2,133,367

METHOD OF CHARGING CONTAINERS WITH INERT GAS AND MATERIALS

Melvin Wagner, Chicago, Ill., assignor to The Liquid Carbonic Corporation, Chicago, Ill., a corporation of Delaware Application December 28, 1936, Serial No. 117,877

10 Claims. (Cl. 226—51)

My invention relates to a method of filling a container, the charging of a container with an inert gas, and the placing of that container within a carton and the subsequent sealing of the container with the inert gas therein prior to the sealing of the carton over the container.

It is the object of my invention to provide the step of flushing a container of its content of air by an inert gas and in particular by an inert gas that is heavier than air.

It is my object to provide a method of picking up a flat container, opening the container, at least partially, and thereafter placing the container in position to have its air content flushed and its inert gas content supplied and its load of materials inserted.

It is my further object to practice a method of loading such a container into a carton and thereafter sealing the top of the container prior to the sealing of the carton.

It is a further object of my invention to provide means of either manual or automatic performance of the foregoing steps of operation.

Referring to the drawings:

Figure 1 is a front elevation of a manually operated mechanism for loading a container with inert gas and with the materials to be sealed within the container and for moving the container into a carton.

Figure 2 is a side elevation of the same mechanism shown in Figure 1.

Figure 3 is a top plan view of the feeding hopper of Figures 1 and 2.

Figure 4 is a section on the line 4—4 of Figure 1 looking in the direction of the arrows.

Figure 5 is a section on the line 5—5 of Figure 1 looking in the direction of the arrows.

Figure 6 is a top plan view of a mechanism for automatically picking up a container, placing it on an expanding mandrel, and thereafter moving it into position to be loaded into its carton, and coincident therewith, in position to be loaded with its contents and to have its interior flushed and filled with inert gas.

Figure 7 is a side elevation of Figure 6.

Figure 8 is a top plan view of a table for automatically moving the container in its carton from loading position to and through the successive sealing positions.

Figure 9 is a front elevation of the mechanism with the table.

Figure 10 is a side elevation of the container mouth-spreading mechanism.

Figure 11 is a section through the one form of mouth-sealing mechanism.

Figure 14 is a section on the line 14—14 of Figure 15 of a rotary, automatic, container expander, gluer and positioner.

Figure 15 is a top plan view thereof.

Figure 16 is a section through the cam track of Figure 15 on the lines 16—16.

Figure 17 is a diagrammatic view showing the container mouth open with the spreader plates inserted.

Figure 12:
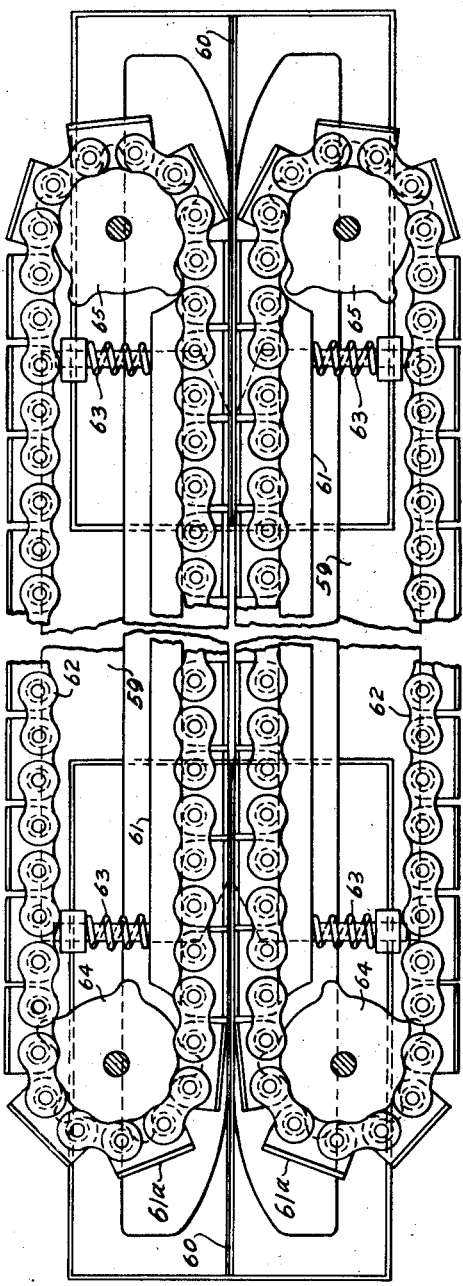
Figure 12 is a plan view thereof.
Figure 13:
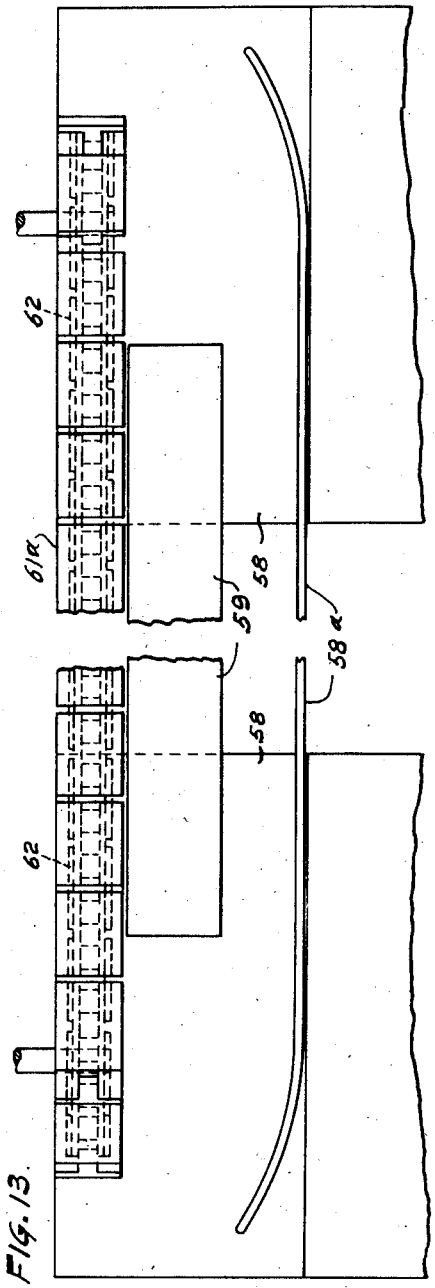
Figure 13 is a detailed side elevation thereof.

Referring to the drawings in detail, 1 is a hopper which is supplied with materials that are to be packaged. A predetermined charge from this hopper can be admitted by the operation of the slide valve 2 to the chute 3. This hopper 1 and the chute 3 are stationary. The chute 3 is telescopically arranged within an outer sliding casing 4 that is preferably spaced therefrom approximately one-eighth of an inch, as will be seen in Figure 4. This casing 4 is guided in its vertical, reciprocatory movement by the guide wheels 5 operating in the oppositely disposed, vertical tracks 6. Mounted on the lower end of the reciprocating sleeve 4 is a spaced sleeve 7. Between the sleeves 4 and 7 is a space 8 which is supplied with an inert gas under pressure such as carbon dioxide gas through the pipe 9. The top of this space is closed. The bottom of this space 8 is open so that the gas can escape into a container supported over the mouth of the opening 8 and the mouth of the chute 3.

In this manner the container can be flushed of its air with the heavier carbon dioxide gas so that the contents of the container will be carbon dioxide gas instead of air; and in this manner the materials to be packaged in the container may descend by gravity, in measured quantities, at the will of the operator.

When the container is mounted upon this open mouth of the chute 3 and the open mouth of the space 8, it can be so charged with gas and loaded and then in its loaded condition inserted within the carton 10 designated by dotted lines at the bottom of Figures 1 and 2. This carton is mounted within a cage 11 and is carried upon a table 12 or an endless conveyor of any desired character.

Container handling mechanism

In order to get the relatively thin container from a stack of such folded, flat containers, I provide the following mechanism. A stack of these flat containers indicated by dotted lines at 13 is supported on a support 14 having side walls 15. The outer end of this support 14 is cut away as at 15a so that there can project upwardly through this cutaway space a vacuum cup or cups 16, from which the air is currently exhausted through a pipe 17. These cups are mounted upon a support 18 that is reciprocated by the pitman 19 from a pick-up position beneath the overhanging mouth of the lowermost container indicated at 19a.

The vacuum cup is guided in its reciprocation by a cross rod 20 operating in a cam groove 21 in the cam plates 22. When the vacuum cup is elevated by the high supports in the cam 23 and the vacuum is applied, the cup 16 attaches itself to the exposed end of the container 19a adjacent its open end and thereafter the lowermost container is moved to the left hand as in Figures 6 and 7. As it is so moved, the mouth is spread open by the descent of the rod 20 in the cam slots 21 so that the container mouth is open sufficiently to enable the container spreading plates 24 and 25 whose ends are in engagement with one another at 26 to enter the container. The container is moved over these diverging plates 24 and 25 by the continuant left-hand movement of the suction cup and its carrier mechanism. This continues until the rod 20 reaches the end of the cam slots 21 as at 27. At this time the plates 24 and 25, now within the open end of the container, move from a horizontal position to a vertical position as indicated in dotted lines, and in so moving have brought the open mouth of the container to the position shown in Figures 1, 2 and 9.

This is effected by the following mechanism. The plates 24 and 25 are supported pivotally on the links 28 which are interconnected by rods 29 and 30. Rod 30 is connected to swinging arms 31 which are actuated by the pinions 32 and 33. In this manner the container may be swung from its horizontal position to its vertical position to be loaded.

The automatic mechanism of Figures 6 and 7 may be supplanted by a purely manual mechanism such as that shown in Figures 1 and 2 where the plates 24 and 25 have their ends at 26 together so that a container may have its open mouth slipped over these plates. The plates are pivoted on the pivot rods 34. They are normally kept in their collapsed position by the spring 35 attached to the plates at their upper ends at one end of the spring while the other end of the spring is attached to the abutment 36.

The descending charging mandrel 7 for flushing with gas travelling over the loading chute 3, serves to spread these plates apart and to thereby expand the container so that it may be adequately flushed and loaded, and in such condition inserted by the descending action of this mandrel into the carton 10. The guide fingers 37 adjacent the mouth of the carton serve to cooperate in the guiding and arranging of the container within the carton.

A further form of automatic container pick-up, expanding and positioning mechanism of the rotary type is shown in Figures 14, 15 and 16. In this container a spider 38 is mounted upon a support 39. Each of the spider arms 40 pivotally supports at its outer end of the rod 41 a pair of spaced plates 42 which in turn pivotally support at 43 and 44 the container-spreading plates 24' and 25'. The pick-up mechanism is the same as that described in connection with Figures 6 and 7.

The container-supporting plates are held in their horizontal position for this purpose by the cam track 45 which is semi-circular. It rises from the entering end at 46 where it is low, to its high point at 47 halfway between its ends. This high point maintains the plates 24' and 25' in their generally horizontally-disposed position for receiving the container.

After receiving a container in this generally horizontal position, the container-supporting and spreading plates 24' and 25' move rotatably about the support 39 to the position at the bottom of the drawings. In this position the support of the cam track has terminated and the container-supporting plate and the container are now in a vertical position. As they continue to move in a circular path towards the station beneath the loading mandrel which will pass into the container, expand the plates 24' and 25' and load the container, the container passes between oppositely disposed glue rollers 47a in order to give the exterior of the container a small amount of glue. When the container is inserted within the carton, this glue anchors the container in the carton. This arrangement enables a container to be loaded and inserted in a carton while other container supports and expanders are proceeding to pick up a container to be positioned preparatory to doing so.

*Sealing mechanism*

The container has now been loaded and inserted within the carton. The carton flaps at the top of the carton indicated generally at 48 are open, as is also the mouth of the container which projects above the top of the carton. As this carton and its container are moved along by the table 12, a pair of container mouth-expanding fingers 49 and 50 are lowered within the mouth of the container and are then spread apart to draw the opposite walls of the mouth of the container into close relationship.

This is effected by the pitman 51 which reciprocates, carrying the cross-head block 52 which is inserted within the tracks 53 of the guide blocks 54. This pitman and its cross-head block carry the slotted links 55 having slots 56. The links are pivoted at 57 on the end of the pitman 51 and the cross head block 52. A cross rod, which is stationary, at 57a is inserted through these cam slots 56 so that as the pitman 51 descends, the fingers 49 and 50 are spread apart, and as it ascends, the fingers 49 and 50 are withdrawn from the inside of the mouth of the container and are brought adjacent to one another.

The container has within its mouth on the inside of its adjacent walls a sealing medium that can be caused to adhere so as to seal the mouth of the container. This medium may be of any desired character such as adhesive, but preferably a thermo-plastic material which becomes adhesive under the influence of heat and will adhere either by reason of the heat or by reason of the combination of heat and pressure.

The flaps 48 of the carton, as the table 12 progresses from the left hand, and in Figure 9 to the right hand, are held down by the spaced guide shields 58a, between which the vertically-disposed, adjacent walls of the mouth of the container as at 58 pass. These walls of the mouth of the container within which is the thermo-plastic material likewise pass between the adjacent spaced heating unit blocks 59 that may be heated in any desirable manner. This is facilitated by the upper ends of the container walls 58 designated 60, being engaged by the spring guide bars 61 and the feed blocks 61a carried on the transport chains 62. The springs 63 actuate these blocks. The chains are carried on sprockets 64 and 65 at their respective ends. Thus the thermoplastic material within the upper ends of the walls of the container are brought into engagement and heated. If the material is of a type that will adhere by heating alone, then no pressure is applied and only a guiding action takes place. If, however, pressure is also necessary, the necessary adjustments can be made as indicated.

Thereafter the sealed upper end of the container is folded in the usual manner and the top flaps 48 of the carton are likewise folded and sealed.

The container which I prefer to use with this mechanism is set forth and described in my co-pending application Ser. No. 114,651, filed December 7, 1936, but this mechanism is not limited to any particular type of container.

One of the advantages of this method is that it may be placed in any production line and may be used in connection with carton-sealing mechanism of conventional character.

My apparatus for charging containers with inert gas and materials is covered by a separate application, Ser. No. 116,807, filed December 19, 1936, while this application covers the method.

It will be understood that I desire to comprehend within my invention such modifications as may be necessary to adapt it to varying conditions and uses.

Having thus fully described my invention, what I claim as new and desire to secure by Letters Patent, is:

1. In a method of loading a container and assembling with a carton, the steps of (a) introducing a gas and materials to be packed into the container, (b) simultaneously expanding the container, (c) moving the container from its support while being so filled and introducing it into a supporting carton, and (d) sealing the mouth of the container while it is supported by the carton.

2. In a method of loading a container and assembling it with a carton, the steps of (a) mounting the container on a mandrel to mechanically expand it, (b) expanding the container, (c) filling the container to further expand it with inert gas and flushing air therefrom, (d) filling the container with material, and inserting it into a carton (e) withdrawing the mandrel from the container.

3. In a method of loading a container and assembling it with a carton, the steps of (a) mounting the container on a mandrel to mechanically expand it, (b) expanding the container, (c) filling the container to further expand it with inert gas and flushing air therefrom, (d) filling the container with material and inserting it into a carton, (e) withdrawing the mandrel from the container, (f) spreading the top section of the carton apart and closing the mouth of the container; and (g) sealing the mouth of the container thermoplastically.

4. In a method of filling a container, the steps of (a) indexing a carton in line with a container, (b) suspending the container above the carton preparatory to inserting the container into the carton, (c) expanding the container, (d) moving the container into the carton, and (e) simultaneously gassing the container and filling it as it enters the carton.

5. In a method of filling a container, the steps of (a) indexing a carton in line with the container, (b) suspending the container above the carton to insert it in the carton, (c) simultaneously expanding the container and displacing the air therefrom, (d) simultaneously moving the container into said carton and placing material therein as the container moves into the carton; and (e) moving the loaded container and carton to a new position and sealing the container with a thermoplastic medium while holding the carton in open position.

6. In a method of filling a container, the steps of (a) expanding a container and evacuating air therefrom by introducing a heavier inert gas in the container; (b) inserting the container into a carton; (c) commencing to load material into the container with its inert gas contents as the container proceeds into the carton, the carton supporting the container so that the contents of the container and the volume of gas in the container may be adjusted according to the size of the surrounding carton; and (d) thereafter sealing the container while in the carton.

7. In a method of loading a container into a carton and loading the container, the steps of (a) expanding a container mechanically; (b) introducing the container into a carton; (c) introducing gas heavier than air into the container as it is introduced into the carton to flush the air therefrom; and (d) simultaneously introducing the container into the carton, and commencing the loading of the carton with material so that the container is being filled with material as the container enters the carton.

8. In a method of loading a container into a carton and loading the container, the steps of (a) expanding a container mechanically; (b) introducing the container into a carton; (c) introducing gas heavier than air into the container as it is introduced into the carton to flush the air therefrom; (d) simultaneously introducing the container into the carton and beginning the loading of material so that the container is being filled with material as the container enters the carton; and (e) completing the filling of the carton.

9. In a method of loading a container into a carton and loading the container, the steps (a) expanding a container mechanically; (b) introducing the container into a carton; (c) introducing gas heavier than air into the container as it is introduced into the carton to flush the air therefrom; (d) simultaneously introducing the container into the carton and beginning the loading of material so that the container is being filled with material as the container enters the carton; (e) completing the filling of the carton; and (f) laterally distending the mouth of the container and lowering the walls forming the mouth of said container towards the carton in its distended condition with the top walls thereof in parallel.

10. In a method of loading a container and assembling with the carton, the step (a) of expanding the container and inserting it into a carton; and the step (b) of expelling air from the container with an inert gas and filling the container with material as said container is inserted into the carton.

MELVIN WAGNER.